(12) United States Patent
Danzer

(10) Patent No.: US 6,847,007 B2
(45) Date of Patent: Jan. 25, 2005

(54) PROCESS GAS AND LASER MACHINING METHOD

(75) Inventor: Wolfgang Danzer, Dorfen (DE)

(73) Assignee: Linde Aktiengesellschaft, Wiesbaden (DE)

( * ) Notice: Subject to any disclaimer, the term of this patent is extended or adjusted under 35 U.S.C. 154(b) by 14 days.

(21) Appl. No.: 10/601,318

(22) Filed: Jun. 23, 2003

(65) Prior Publication Data

US 2004/0060911 A1 Apr. 1, 2004

Related U.S. Application Data

(63) Continuation of application No. PCT/EP01/15127, filed on Dec. 20, 2001.

(30) Foreign Application Priority Data

Dec. 22, 2000 (DE) .......................................... 100 64 325
Dec. 22, 2000 (DE) .......................................... 100 64 327

(51) Int. Cl.$^7$ ............................................... B23K 26/12
(52) U.S. Cl. .................... 219/121.84; 216/65; 252/372; 252/374
(58) Field of Search ....................... 219/121.84, 121.85; 252/372, 374, 377; 216/65

(56) References Cited

U.S. PATENT DOCUMENTS

| | | | |
|---|---|---|---|
| 5,558,786 A | | 9/1996 | Couch, Jr. et al. |
| 5,653,896 A | * | 8/1997 | Couch et al. .......... 219/121.44 |
| 6,071,796 A | * | 6/2000 | Voutsas ...................... 438/487 |
| 6,242,291 B1 | * | 6/2001 | Kusumoto et al. .......... 438/158 |

FOREIGN PATENT DOCUMENTS

| | | |
|---|---|---|
| EP | 0 990 480 | 4/2000 |
| EP | 1 022 087 | 7/2000 |
| WO | WO 02/051579 A1 | 7/2002 |

\* cited by examiner

*Primary Examiner*—Geoffrey S. Evans
(74) *Attorney, Agent, or Firm*—Crowell & Moring LLP

(57) ABSTRACT

A process gas and a process of laser machining, such as laser beam fusion cutting or laser beam welding is provided. A gas mixture that contains at least oxygen and hydrogen, in addition to an inert has, is used as the process gas. The ratio of oxygen to hydrogen in the process gas is hypostoichiometric with respect to the reaction $2\ H_2+O_2+\rightarrow 2\ H_2O$, which causes the process gas to exhibit a reductive effect.

36 Claims, No Drawings

PROCESS GAS AND LASER MACHINING METHOD

CROSS REFERENCE TO RELATED APPLICATIONS

This application is a continuation of International Patent Application No. PCT/EP01/15127, filed Dec. 20, 2001, designating the United States of America, and published in German as WO 02/051579, the entire disclosure of which is incorporated herein by reference. Priority is claimed based on Federal Republic of Germany patent application no. DE 100 64 327.2, filed Dec. 22, 2000, and based on Federal Republic of Germany patent application no. DE 100 64 325.6, filed Dec. 22, 2000.

BACKGROUND AND SUMMARY OF INVENTION

The invention relates to a process gas for use in laser machining processes, such as laser welding or laser beam fusion cutting. The invention further relates to a process for laser machining materials, whereby a focused laser beam impinges against the surface of the work piece to be machined, and a process gas stream is directed against the surface of the work piece.

Due to the properties of the laser beam, in particular its intensity and ease of focusing, lasers are used today in many areas of material processing. The laser machining systems used are known in the art. In general, these comprise a laser machining head, if applicable comprising a nozzle arranged coaxially to the laser beam. Often, laser machining systems are used in conjunction with CNC controls of guide machines for an x-y cutting direction. In addition, in laser beam cutting, handling systems for three-dimensional work pieces are being used with increasing frequency. An automatic adjustment of cutting parameters (laser power adjusted to the current cutting speed during the cutting process) based upon the contour to be cut is generally a prerequisite for a good cut quality, even around sharp corners and acute angles.

Within the scope of the invention, a focused laser beam is understood to be a laser beam that is focused essentially on the surface of the work piece. In addition to the methods predominantly used, comprising laser beams that are focused on the surface of the work piece, the invention can also be applied with the seldom used variant in which the beam is focused not precisely on the surface of the work piece.

In many laser material machining processes, metallic and/or other materials are heated to temperatures at which a reaction with the enveloping gases occurs. Thus, in many cases industrial gases are employed in order to allow these material machining processes to be implemented more effectively, more rapidly, and/or with improved quality.

Worldwide, laser beam cutting is the most frequently employed laser machining process. For example, in Germany more than 80% of laser machining systems are used for cutting. In laser beam cutting, differentiation is made between laser beam flame cutting, laser beam fusion cutting, and laser beam sublimation cutting. In laser beam fusion cutting, the material is melted open at the point of separation using the laser beam. The melted material is forced out of the cut joint via a process gas. Laser beam fusion cutting using a process gas under high pressure has proven effective in cutting specialty steels, but is also used with other materials such as structural steels and aluminum. An inert gas is usually used as the process gas in laser beam fusion cutting.

In laser beam welding, process gases fulfill different purposes. The control and reduction of the plasma is imperative at high laser power levels. This is known, for example, from the publication "Laser im Nebel" [Laser in the Mist], Dr. W. Danzer and Klaus Behler, journal LASER, edition 1/87, pages 32 through 36. Other objectives such as protection against oxidation, metallurgical optimization, and/or a maximization of speed and quality (spatter formation, pores, seam quality) have up to now been neglected. In laser beam welding, the process of using inert shielding gases such as helium or argon is known. Nitrogen is also used at times. Now and then, admixtures are also added in small quantities.

The speed of the welding and cutting processes with the laser beam is limited by the balance between "energy introduced—energy lost (radiation, thermal conduction)". The energy of the laser beam is highly concentrated, however with materials that cannot be cut with the help of the exothermal reaction with oxygen this energy becomes the limiting parameter.

For example, in cutting a 3 mm steel sheet using a 900 w laser and pure oxygen as the process gas, in addition to the 900 watts of energy coming from the laser, an additional 600 watts from the burning of the iron in the cutting joint enter into the cutting process. This results in a cutting speed of approximately 3 m/min.

However, in cutting a 3 mm chromium-nickel steel sheet using a 900 watt laser, for example, which due to the resulting slag is not cut with oxygen, but must be cut with an inert gas such as nitrogen or argon, this additional energy is missing from the reaction $Fe + \frac{1}{2} O_2 \rightarrow FeO$. The maximum cutting speed decreases correspondingly to approximately 1.5 m/min.

An object of the present invention is thus to reveal a process gas and a method of the type described at the beginning which will permit improved laser machining. In this, a high cutting speed for laser beam fusion cutting is sought. In particular, the goal is to enable a high-quality, process-safe, and reproducible laser beam fusion cutting process. In laser beam welding, the goal is to achieve a maximization of speed and quality, in addition to controlling and reducing the plasma, using the process gas specified in the invention. In this, the invention is aimed primarily at cases in which an inert gas is customarily used as the process gas.

This object is attained according to the invention with a process gas that contains at least oxygen and hydrogen, in addition to at least one inert gas.

DETAILED DESCRIPTION OF THE INVENTION

The invention is based upon the concentration of energy from the reaction $2 H_2 + O_2 \rightarrow 2 H_2O$ at the point at which the laser beam is working.

The reaction $2 H_2 + O_2$ contributes various advantages that work well with the laser beam:

1. It is clean.
2. It is more or less reductive depending upon the mixing ratio $H_2/O_2$.
3. It is very rapid.
4. It is high energy.
5. It will run especially in places where high temperatures are present, i.e. at the point of machining.

If the process gas specified in the invention is used with the laser beam fusion cutting process, the metal components emerge from the cutting process bright. In laser welding, the invention produces a positive effect on plasma formation.

In improvements according to certain preferred embodiments of the invention, a process gas mixture that will produce a reductive effect can be used. By selecting the hypostoichiometric ratio of oxygen to hydrogen in the process gas mixture with respect to the reaction $2 H_2+O_2 \rightarrow 2 H_2O$, the degree of reductive effect of the process gas can be established. This means that, depending upon the selection of the hypostoichiometric ratio of oxygen to hydrogen in the process gas, a more or less reductive process gas mixture can be used. Thus, in laser machining a valuable opportunity for adjusting to conditions present in individual cases, including those of the material to be processed, is provided. In laser fusion cutting, the reductive effects of the process gas cause the metal components to emerge from the cutting process bright.

Advantageously, the inert gas in the process gas can contain one or more of the gas components from the group nitrogen, argon, and helium. However, nitrogen is preferably used as the inert gas in laser fusion cutting.

According to certain preferred embodiments of the invention, the process gas can contain a share of oxygen of between 0.1 and 30% by volume, preferably between 0.5 and 25% by volume, most preferably between 1 and 20% by volume.

Advantageously, the share of hydrogen in the process gas amounts to between 1 and 70% by volume, preferably between 5 and 60% by volume, most preferably between 10 and 50% by volume.

In a further development of certain preferred embodiments of the invention, the process gas is mixed from a gas mixture containing at least hydrogen or hydrogen and inert gas (in particular nitrogen and/or argon) and air.

Advantageously, according to certain preferred embodiments of the invention, the process gas used in laser beam fusion cutting is comprised largely of nitrogen and argon. In particular, the cutting gas can contain more than 10% by volume nitrogen and/or argon, preferably between 20 and 98% by volume nitrogen and/or argon, most preferably between 30 and 95% by volume nitrogen and/or argon. It is also possible for other gases besides nitrogen and argon to be contained in the inert gas quantities listed.

In certain preferred embodiments of the invention, the process gas used in laser beam fusion cutting can be comprised of
 a ternary mixture of nitrogen, oxygen, and hydrogen,
 a ternary mixture of argon, oxygen, and hydrogen,
 a quaternary mixture of nitrogen, argon, oxygen, and hydrogen.

In embodiments of the process for laser machining work pieces specified in the invention, such as laser beam fusion cutting or laser beam welding, a process gas as disclosed above is used.

In certain preferred embodiments of the invention, by establishing the ratio of oxygen to hydrogen in the process gas with respect to the reaction $2 H_2+O_2 \rightarrow 2 H_2O$, the degree of reductive effect produced by the process gas can be determined. This means that based upon the selection of the hypostoichiometric ratio of oxygen to hydrogen in the process gas, a more or less reductive process gas can be used. In this manner, the process gas can be adjusted to meet existing conditions.

The process gas can be supplied premixed to the laser machining system.

In an alternative embodiment of the invention, at least individual components of the process gas mixture are mixed in the laser welding/cutting machine before reaching the welding/cutting nozzle, and/or are swirled in the welding/cutting nozzle. In this case, the welding/cutting machine or the welding/cutting nozzle contains correspondingly designed devices, in particular built-in components as flow guides.

The process gas specified in certain preferred embodiments of the invention is suited for use in laser beam fusion cutting, and the process is suited for the laser beam fusion cutting of materials that cannot be cut via a laser beam flame cutting process. The invention allows high-quality, reproducible cutting at an increased cutting speed via laser fusion, and has proven to be process-safe. Further, the invention results in an improvement in the formation of perforations in laser beam fusion cutting.

The process gas specified in certain preferred embodiments of the invention is suited for use in laser welding, and the process is suited for the laser welding of coated materials, above all steels, in particular galvanized steels. Tests on galvanized steel sheets produced very positive results. To some extent, the speed can be greatly increased.

As a rule, the invention necessitates no modifications to existing laser devices and armatures.

The invention can be used in conjunction with all types of lasers. In certain preferred embodiments of the invention, it is suited for use in laser machining using Nd—YAG lasers, diode lasers, and $CO_2$ lasers.

With laser beam fusion cutting as an example, with the help of the energy balance, it can be demonstrated how much additional energy can be supplied to the laser cutting process with the help of the invention.

The following gas quantities are used in certain preferred embodiments of the invention:

6 m³/h mixture of 50% $H_2/N_2$ and 5 m³/h compressed air. Resulting mixture at point of cutting:

11 m³/h with approximately 10% $O_2$, 30% $H_2$, and 60% $N_2$.

In the combustion of the 10% $O_2$ in this mixture, 255,000 kJ are released per hour, which translates to an additional output of 70 kW. If only 1/100 of this power is used in the cutting joint, this means that the overall power of the laser cutting process is nearly doubled.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A method of laser machining comprising:
    impinging a focused laser beam upon a surface of a work piece; and
    directing a process gas stream against the surface of the work piece,
    wherein the process gas stream comprises oxygen, hydrogen, and at least one inert gas, and
    wherein the ratio of oxygen to hydrogen in the process gas is hypostoichiometric with respect to the reaction $2H_2+O_2 \rightarrow H_2O$.

2. The method of claim 1, wherein the method of laser machining comprises a method of laser beam fusion cutting, and wherein the work piece is composed of a material that cannot be cut using a laser beam flame cutting process.

3. The method of claim 1, further comprising selecting a hypostoichiometric ratio of oxygen to hydrogen in the process gas in order to determine the degree of reductive effect of the process gas.

4. The method of claim 1, wherein the at least one inert gas is selected from the group consisting of nitrogen, argon and helium.

5. The method of claim 1, wherein the process gas comprises between about 0.1% and about 30% by volume of oxygen.

6. The method of claim 1, wherein the process gas comprises between about 0.5% and about 25% by volume of oxygen.

7. The method of claim 1, wherein the process gas comprises between about 1% and about 20% by volume of oxygen.

8. The method of claim 1, wherein the process gas comprises between about 1% and about 70% by volume of hydrogen.

9. The method of claim 1, wherein the process gas comprises between about 5% and about 60% by volume of hydrogen.

10. The method of claim 1, wherein the process gas comprises between about 10% and about 50% by volume of hydrogen.

11. The method of claim 1, wherein the process gas is mixed from a gas mixture comprising hydrogen and air; or hydrogen, an inert gas, and air.

12. The method of claim 1, wherein the method of laser machining comprises a method of laser beam fusion cutting, and wherein the process gas comprises more than about 10% by volume of at least one gas selected from the group consisting of nitrogen and argon.

13. The method of claim 12, wherein the process gas comprises between about 20% and about 98% by volume of at least one gas selected from the group consisting of nitrogen and argon.

14. The method of claim 12, wherein the process gas comprises between about 30% and about 95% by volume of at least one gas selected from the group consisting of nitrogen and argon.

15. The method of claim 1, wherein the method of laser machining comprises a method of laser beam fusion cutting, and wherein the process gas consists essentially of nitrogen, oxygen, and hydrogen; or argon, oxygen, and hydrogen; or nitrogen, argon, oxygen, and hydrogen.

16. The method of claim 1, wherein the process gas stream is directed against the surface of the work piece by a laser machining apparatus, and wherein the process gas is supplied premixed to the laser machining apparatus.

17. The method of claim 1, wherein the process gas stream is directed against the surface of the work piece by a laser machining apparatus having at least one of a welding nozzle and a cutting nozzle, and wherein a plurality of individual components of the process gas are mixed in the laser machining apparatus before reaching the at least one nozzle.

18. The method of claim 1, wherein the process gas stream is directed against the surface of the work piece by a laser machining apparatus having at least one of a welding nozzle and a cutting nozzle, and wherein a plurality of individual components of the process gas are swirled in the at least one nozzle.

19. The method of claim 1, wherein the method of laser machining comprises a method of laser beam welding, and wherein the work piece is composed of a coated material.

20. The method of claim 19, wherein the coated material is selected from the group consisting of steel and galvanized steel.

21. A process gas for use in laser machining processes, comprising oxygen, hydrogen, and at least one inert gas,
wherein the ratio of oxygen to hydrogen in the process gas is hypostoichiometric with respect to the reaction $2H_2 + O_2 \rightarrow 2H_2O$.

22. The process gas of claim 21, wherein the process gas comprises between about 20% and about 98% by volume of at least one gas selected from the group consisting of nitrogen and argon.

23. The process gas of claim 22, wherein the process gas comprises between about 30% and about 95% by volume of at least one gas selected from the group consisting of nitrogen and argon.

24. The process gas of claim 21, wherein the at least one inert gas is selected from the group consisting of nitrogen, argon, and helium.

25. The process gas of claim 21, wherein the process gas comprises between about 0.1% and about 30% by volume of oxygen.

26. The process gas of claim 25, wherein the process gas comprises between about 0.5% and about 25% by volume of oxygen.

27. The process gas of claim 25, wherein the process gas comprises between about 1% and about 20% by volume of oxygen.

28. The process gas of claim 21, wherein the process gas comprises between about 1% and about 70% by volume of hydrogen.

29. The process gas of claim 28, wherein the process gas comprises between about 5% and about 60% by volume of hydrogen.

30. The process gas of claim 28, wherein the process gas comprises between about 10% and about 50% by volume of hydrogen.

31. The process gas of claim 21, wherein the process gas comprises more than about 10% by volume of at least one gas selected from the group consisting of nitrogen and argon.

32. A process gas for use in laser machining processes, consisting essentially of:
nitrogen, oxygen, and hydrogen; or
argon, oxygen, and hydrogen; or
nitrogen, argon, oxygen, and hydrogen,
wherein the ratio of oxygen to hydrogen in the process gas is hypostoichiometric with respect to the reaction $2H_2 + O_2 \rightarrow 2H_2O$.

33. The process gas of claim 32, wherein the process gas consists essentially of between about 0.1% and about 30% by volume of oxygen.

34. The process gas of claim 32, wherein the process gas consists essentially of between about 1% and about 70% by volume of hydrogen.

35. The process gas of claim 32, wherein the process gas consists essentially of more than about 10% by volume of nitrogen.

36. The process gas of claim 32, wherein the process gas consists essentially of more than about 10% by volume of argon.

* * * * *